United States Patent
Whiteaway et al.

(10) Patent No.: US 6,714,702 B2
(45) Date of Patent: Mar. 30, 2004

(54) OPTICAL DEMULTIPLEXING SYSTEM AND METHOD

(75) Inventors: James E Whiteaway, Sawbridgeworth (GB); Andrew J Collar, Bishops Stortford (GB); Stephen Day, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 312 days.

(21) Appl. No.: 09/825,064

(22) Filed: Apr. 3, 2001

(65) Prior Publication Data

US 2002/0141693 A1 Oct. 3, 2002

(51) Int. Cl.[7] ............................. G02B 6/293; G02B 6/28
(52) U.S. Cl. ............................................ 385/24; 398/79
(58) Field of Search .............................. 385/24, 15, 16, 385/31, 39; 398/43, 79, 82, 89

(56) References Cited

U.S. PATENT DOCUMENTS 6,160,932 A * 12/2000 Haung et al. .................. 385/24

* cited by examiner

*Primary Examiner*—Walter E. Snow
(74) *Attorney, Agent, or Firm*—Barnes & Thornburg

(57) ABSTRACT

An optical demultiplexer has a coarse filter 41,43,45 and a plurality of arrayed waveguide gratings (AWGs) 49 connected to respective outputs of the coarse filter 41,43,45. The AWGs are of like design with a plurality of configurations and are arranged to have a configuration corresponding to be frequency range output on the respective output. The device can be used in WDM systems.

20 Claims, 10 Drawing Sheets

OPTICAL DEMULTIPLEXING SYSTEM AND METHOD

This application relates to an optical demultiplexing system and method such as may be employed in the system and method described in U.S. provisional application relating to a high performance optical multiplexer and demultiplexer being filed on the same day as the present application by David Boertjes and Kim Roberts, to be assigned to Nortel Networks, under the Nortel Networks reference of 13587RO.

FIELD OF THE INVENTION

The invention relates to an optical demultiplexing system and method, and particularly to a system and method for splitting an optical signal carrying a number of information channels at different frequencies.

BACKGROUND OF THE INVENTION

Optical communications systems increasingly use wavelength division multiplexing (WDM) in which a number of distinct optical signals are transmitted at different wavelengths, generally down an optical fiber. For example, optical communication in the so-called "C" band may allow the transmission of 40 channels, or frequencies, at regular intervals, each carring 10 Gb/s of data. One optical signal can be transmitted at each frequency down a single optical fiber. Other bands and/or other numbers of channels may be used, for example, 56 channels in the "L" band, each carrying 10 Gb/s.

A key component in WDM systems is a demultiplexer for splitting apart optical signals at a plurality of wavelengths into the individual channels at individual wavelengths. This may be done using a splitter and a number of different filters tuned to the individual frequencies, by components that demultiplex the light directly, or a combination of these approaches.

One approach to filtering and demultiplexing is to use an arrayed waveguide grating (AWG), also known as a phased-array device. The operation and design of AWGs is described, for example, in "PHASAR-Based WDM-Devices: Principles, Design and Applications", Meint K. Smit, IEEE Journal of Selected Topics in Quantum Electronics, Vol. 2, No. 2, June 1996.

FIGS. 1 to 3 illustrate an AWG device. FIG. 1 shows a top view of the AWG, FIG. 2 a side section through a waveguide of the AWG and FIG. 3 is a detailed top view of part of the AWG device. A plurality of optical waveguides 3 are devil on a substrate 1 in a known way. For example, to define the waveguides a buffer layer 5 may be deposited on the substrate, a core 7 deposited along part of the buffer layer to define the waveguide 3 and a cladding layer 9 provided to cover the core and buffer layers. The refractive indices of the buffer 5, core 7 and cladding 9 layers are selected so that light is guided along the waveguide in the region of the core.

The arrayed waveguide device includes an array 11 of waveguides 3 arranged side by side on the substrate and extending between an input star coupler 13 and an output star coupler 15. The input and output star couplers 13,15 are defined by a wide core region in which light can travel freely in the two-dimensional plane of the substrate. This region is known as the free propagation region. Input 17 and output 19 optical waveguides are provided to feed input light into the array 11 of waveguides and to output light from the array respectively. There may be a plurality of input waveguides 17 or output waveguides 19.

As an example FIG. 3 illustrates the output star coupler of a system with a singe input waveguide and a plurality of output waveguides. The ends 21 of the array of waveguides 11 are usually on a geometric circle 23 of radius r whose centre is at the centre 25 of an image plane 27. The output waveguides 19 are arranged on the image plane, which also constitutes a circle. Note that the centres of the circles are not coincident, and may not have equal radii.

The length of the individual waveguides 3 of the array 11 differ (see FIG. 1) and the shapes of the star couplers 13, 15 are chosen so that light input to the input optical waveguide 17 passes through the array 11 of waveguides and creates a diffraction pattern on the output waveguide or waveguides, such that light of a predetermined cent wavelength creates a central interference peak at the centre 25 of the image plane. Light with frequencies slightly higher or lower than the predetermined central frequency is imaged with a central interference peak slightly above or below the centre of the image plane.

In order to achieve this result the optical path length difference between adjacent waveguides of the array is chosen so that it is an integral multiple of the central wavelength. Accordingly, light at the central wavelength which enters the array of waveguides in phase will also leave in phase and thus will create the central diffraction spot at the centre of the image plane. Light with a slightly different frequency will arrive at the output star coupler with slight phase differences across the array, which will cause the light to be imaged to a spot on the image plane a little away from the central spot.

Accordingly, the plurality of output waveguides arranged on the output plane receive light of slightly different frequencies. Equally spaced output waveguides correspond to equally spaced frequencies, at least to a first order of approximation.

FIG. 3 shows the effect of one or more output waveguides connected to the output star coupler 15. It is alternatively or additionally possible to arrange a plurality of input waveguides on the input star coupler with the some effect.

An AWG has a number of properties. One important property is that the distance of the image spot along the image plane as a function of wavelength is substantially linear in wavelength, for wavelengths around the central wavelength. Accordingly, it is possible to separate a number of signals with regular channel separations by positioning output waveguides at substantially regular intervals along the output plane.

A second important property is that the AWG has a repeat frequency. In other words, the interference properties as a function of frequency repeat with a period in the frequency domain. This period is known as the free spectral range (FSR). The free spectral range is a function of the difference in optical length between adjacent waveguides; a large optical length difference results in a small FSR and vice versa.

Although an AWG can carry out demultiplexing, it is not generally practical to demultiplex a large number of channels using a single AWG. For example, it can be impracticable to demultiplex each of the 40 channels in the C-band using a single AWG, for four reasons. Firstly, the C-band covers some 4 000 GHz so the AWG would need an FSR of at least this much. This would result in small path length differences between each waveguide of the array of the AWG and hence a physically large AWG device. Secondly, it would be necessary to provide 40 output waveguides, which would also lead to a large device. Thirdly, the accumulated cross-talk into one channel from the other thirty-nine channels may be excessive. Finally, in some applications it is desired to process a group of channels, e.g. for dispersion compensation, so a multi-stage process might be preferred.

However, all alternative system with separate AWGs in each frequency range would greatly increase the parts count of an optical system and would likewise be inconvenient and difficult to manufacture.

Accordingly, there is a need for an improved optical demultiplexer capable of accurately dividing an optical signal having a moderate or large number of optical channels into individual channels.

Furthermore, in some cases there is a need to apply some processing on optical signals in broad frequency bands as well as to divide the optical signal into marrow frequency bands or individual channels.

Further, the manufacturing costs of optical components can be considerable and it would be beneficial to reduce these costs.

SUMMARY OF INVENTION

In a first aspect of the invention there is provided an optical system, comprising; an optical splitter for splitting an input optical signal between optical outputs; and a plurality of demultiplexers of like design, each demultiplexer having a plurality of input guides and a plurality of output guides, each input guide having a predetermined frequency range for which optical signals input into the input glide are divided between the plurality of output guides according to frequency; wherein the optical outputs of the optical splitter are connected to respective demultiplexers through input guide having a plurality of different predetermined frequency ranges.

By providing a plurality of inputs for the demultiplexers it is possible for each demultiplexer to demultiplex a subset of the frequency band of the signal input to the splitter, without having to cope with the whole band. This avoids any difficulties in providing a demultiplexer capable of demultiplexing a whole band. For examples in a system demultiplexing 40 channels in the C band, it is very difficult to design a single demultiplexer capable of dividing the 40 channels between 40 outputs evenly and with a suitably low insertion loss.

Moreover, by using a plurality of demultiplexers of like design, the arrangement becomes simple to manufacture. It is only necessary to connect a number of like components to the outputs of the splitter; there is no need to stock a variety of different parts or to fine tune the demultiplexers once in place. All that is required is to connect the correct input.

The demultiplexers may be arrayed waveguide gratings with a plurality of input waveguides. Arrayed waveguide gratings with large numbers of outputs tend to have different losses depending on the location of the output waveguide. These differences can be minimised by having a reduced number of output waveguides and using a number of input waveguides.

The predetermined frequency ranges of the input guides may span a predetermined input light frequency range without overlapping, so that the input light frequency range can be split into narrow frequency ranges, which may correspond to individual channels.

The optical splitter may include filtering functionality, for example at least one coarse filter, for dividing light into predetermined broad frequency ranges output on respective optical outputs which in turn are connected to input guides having corresponding predetermined frequency ranges. In this way, cross-talk between channels can be reduced. Any light that is output on the wrong output of the optical splitter, because of imperfections in the coarse filter, will be passed to a demultiplexer optical input that does not correspond to its frequency, and so the demultiplexer will not pass the light.

According to a second aspect of the invention there is provided an optical system for optical processing of an optical signal divided into a plurality of predetermined groups of channels, comprising: a plurality of optical outputs, each optical output outputting signals in a respective frequency range that corresponds to a predetermined group of channels; a plurality of demultiplexers of like design, each demultiplexer having a plurality of input guides and a plurality of output guides, each input guide having a predetermined frequency range for which optical signals input into the input guide are divided between the plurality of output guides according to frequency; wherein the optical outputs are connected to respective demultiplexers, each optical output connected to the respective demultiplexer through an input guide having a predetermined frequency range corresponding to the frequency of the respective frequency range of the optical output.

The use of demultiplexers of like design greatly simplifies the manufacture of the device. There is no need to stock a number of different types correspond to different frequency ranges. By like design is meant designs that are largely identical or equivalent. The demultiplexers may be of substantially identical design.

The demultiplexers may have cyclic properties that repeat in frequency with a period of the free spectral range. In particular, the demultiplexers may be arrayed waveguide gratings.

A coarse frequency splitter can be used for dividing an input optical signal into the predetermined groups of channels.

Separate dispersion compensation may be provided for each of the predetermined groups of channels. In this way, the dispersion compensation can be separately optimised for each frequency range.

It is also possible to provide separate gain control for the different channels or groups of channels.

Switches may be provided on the inputs of the demultiplexers for switching the outputs of the optical processing section into the corresponding inputs. In his way the switches can be configured in a separate operation to manufacture, which simplifies manufacture.

The demultiplexers may demultiplex signals in frequency bands corresponding to each input and reject signals in adjacent frequency bands. In other words, signals in a frequency band adjacent to the frequency band corresponding to an input are not distributed into any of the outputs of the demultiplexers. This can reduce cross-talk.

The demultiplexers may be AWGs.

The AWGs may be arranged to demultiplex the signals of broad frequency range to which they are attached by realising that the AWGs have properties that repeat in frequency with a period of the free spectral range. Thus, for each input a different group of frequencies of predetermined width within each free spectral range is demultiplexed and at least one other group of frequencies of predetermined width is rejected. The inputs of the AWGs connected to the outputs of the coarse filter can then be selected to be cyclic with increasing frequency of the respective broad frequency range wherein the cycle repeats with a repeat frequency substantially equal to the free spectral range such that each AWG demultiplexes the signal corresponding to the broad frequency range of the output of the coarse filter to which it is attached.

For simplicity, the AWG may have two configurations and the AWGs connected to the outputs of the coarse filter in ascending frequency order may be configured alternately in each of the two configurations. However, this is not essential and the AWG may have a larger number of configurations. For example, if the AWG has three configurations the cyclical configurations in ascending frequency order may be first, second, third, first, second, third, first . . . etc.

The provision of a number of inputs giving effectively a number of configurations of the filters of common design brings advantages over the provision of only a single configuration. Consider first a comparative example of an AWG with a single configuration as the demultiplexer. Each broad frequency range might include 4 channels spaced 100 GHz apart, and an AWG of 400 GHz free spectral range and four outputs might be provided for each broad frequency range output to split the broad frequency range into individual channels.

This arrangement would have the disadvantage that it would mean that the coarse filter had to be very precise with sharp edge cutoffs. In commercial devices, if the first broad frequency range corresponded to channels 1 to 4 it is likely that some signal in channel 5 would also be transmitted into the output for channels 1 to 4 since real coarse filters will transmit some signal a little outside the passband. If only a single configuration of AWG were used, then any signal in channel 5 which was transmitted into the AWG on the output of the coarse filter corresponding to channels 1 to 4 would be output from the channel 1 optical output of the AWG.

For example, in embodiment of the present invention there may be two inputs on the like AWGs, one input for demultiplexing channels 1 to 4, channels 9 to 12 etc, and the other for channels 5 to 8, channels 13 to 16, etc. In this way, if some extraneous channel 5 signal is transmitted by the coarse filter into the output corresponding to channels 1 to 4 the filter of common design will not pass that extraneous signal into any of the channel outputs for channels 1 to 4. Similarly, any channel 4 signal appears in the output for the second broad frequency range corresponding to channels 5 to 8 will likewise be rejected.

According to a third aspect of the invention there is provided an optical system, having an optical processor for processing an optical signal divided into a plurality of predetermined groups of channels output on respective optical outputs, and a plurality of demultiplexers of like design connected to the optical outputs, each demultiplexer having a plurality of input guides and a plurality of output guides, each input guide having a predetermined frequency range for which optical signals input into the input guide are divided between the plurality of output guides according to frequency; wherein the optical outputs are connected to respective demultiplexers, each optical output connected to the respective demultiplexer through an input guide having a predetermined frequency range corresponding to the frequency of the respective group of channels of the optical output.

The optical processor may be a coarse filter. Thus, the invention provides, in another aspect, an optical system comprising: a coarse optical filter for dividing an optical signal into a plurality of predetermined groups of channels and outputting the groups of channels on respective optical outputs; a plurality of demultiplexers of like design, each demultiplexer having a plurality of input guides and a plurality of output guides, each input guide having a predetermined frequency range for which optical in put into the input guide are divided between the plurality of output guides according to frequency; wherein the optical outputs are connected to respective demultiplexers, each optical output connected to the respective demultiplexer through an input guide having a predetermined frequency range corresponding to the frequency of the respective group of channels of the optical output.

In another aspect there is provided an optical demultiplexer comprising: a coarse filter having a plurality of outputs for dividing an input optical signal into a plurality of predetermine broad frequency ranges of predetermined width and outputting each predetermined broad frequency range on a respective output; a plurality of arrayed waveguide gratings connected to respective outputs of the coarse filter for demultiplexing optical signals in the respective broad frequency ranges into a plural of narrow frequency ranges; wherein the arrayed waveguide gratings have properties that repeat in frequency with a period of the free special range; the arrayed waveguide gratings have first and second input waveguides, signals put into the different input waveguide rejecting and demultiplexing alternating frequency ranges of the said predetermined width, the first input waveguide rejecting the frequency ranges demultiplexed by the second input waveguide and the second input waveguide rejecting the frequency ranges demultiplexed by the first input waveguide; and the input waveguides of the arrayed waveguide gratings connected to the outputs of the coarse filter alternate with increasing frequency of the respective broad frequency range so that each arrayed waveguide grating demultiplexes the signal corresponding to the broad frequency range of the output of the coarse filter to which it is attached.

The narrow frequency ranges may be equal in size and the broad frequency ranges may each be the same integral multiple of the narrow frequency range. The narrow frequency range may correspond to a signal channel. In this way, the demultiplexer according to the invention may divide an input optical signal including a number of channels into the individual channels.

By using two-input multiple output AWGs, a greatly reduced number of switches can be provided compared to an arrangement in which switches are provided on the outputs of the AWG. Furthermore, by providing two inputs it is only necessary that the outputs cover a range of half of the FSR. This greatly reduces unevenness in power transmission through the AWG, since near to the edges of the band an AWG exhibits significantly increased loss. Further, this arrangement is colorless, i.e. Each AWG can in fact be identical and cope with the whole of the FSR, by correctly adjusting the switch.

As an alternative way of implementing this approach each AWG can be configured by connecting only the desired input of the AWG to the corresponding output. This eliminates any insertion loss caused by the switch, by making the selection of frequency range at the time of manufacture.

The coarse filter may be implemented using a splitter and a pair of filters, for example dielectric filters.

Any filter may be used as the coarse demultiplexer. For example, a polarising filter may be employed.

By providing a two stage demultiplexer optical processing can be carried out on the group of channels output by the coarse filters. The optical processing may be dispersion compensation.

The invention also relates to a node for an optical telecommunications system including a demultiplexer as set output above.

The invention also relates to an optical telecommunications system including: a transmission node providing a WDM optical signal, a receiving node for receiving the WDM optical signal; and an optical fiber connecting the transmission and receiving nodes, wherein the receiving node includes an optical demultiplexer as set out above.

In another aspect, the invention relates to a method of demultiplexing an optical signal, including: dividing the optical signal into a number of broad frequency bands; supplying each of the broad frequency bands to an AWG to split each of the broad frequency bands into a plurality of narrow frequency bands; wherein the AWGs are of common design and have one of at least two configuration, and the configuration of the AWG connected to each of the plurality of outputs of the coarse filter in ascending frequency order is cyclical.

In a yet further aspect, the invention relates to a method of manufacturing an optical demultiplexer, including: connecting an AWG to each output of a coarse filter for dividing an optical signal into a number of broad frequency bands, wherein the AWGs have a number of different configurations; and configuring the AWG such that the configuration of the AWG connected to each of the plurality of outputs of the coarse filter in ascending frequency order is cyclical.

BRIEF DESCRIPTION OF THE DRAWINGS

For a better understanding of the invention specific embodiments will now be described, purely by way of example, with reference to the accompanying drawings in which.

DETAILED DESCRIPTION

Figure 1:
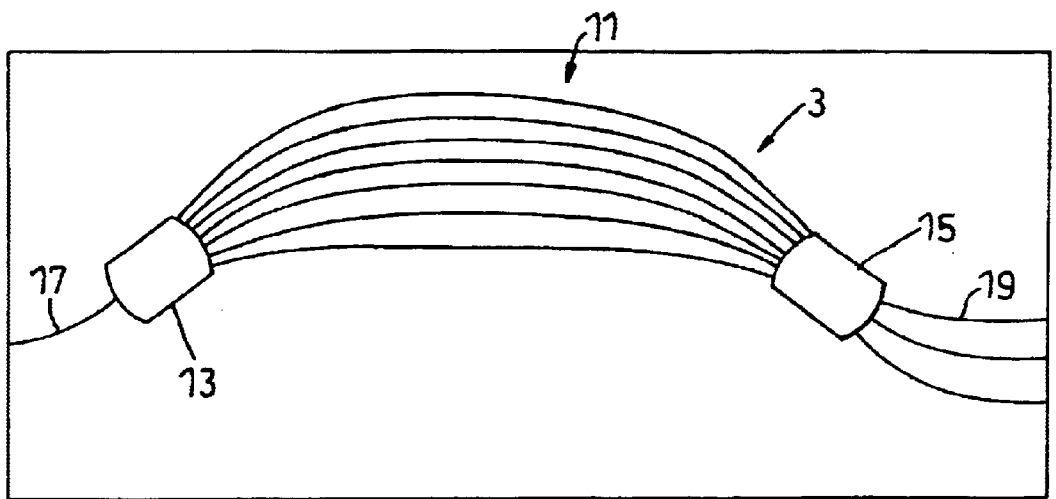
FIG. 1 shows a known AWG device.
Figure 2:
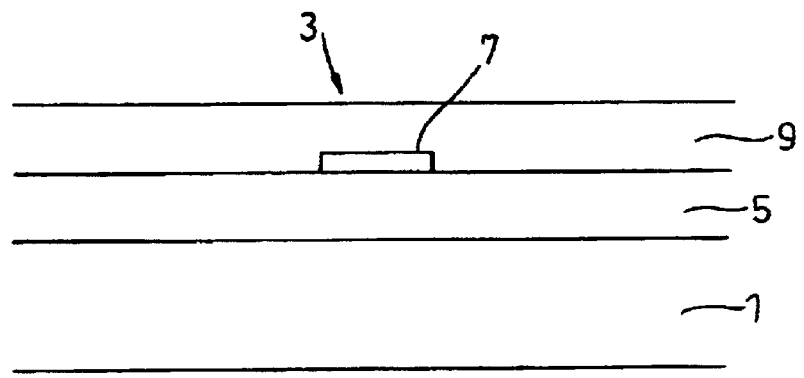
FIG. 2 illustrates the cross section through a waveguide used in the AWG device of FIG. 1.
Figure 3:
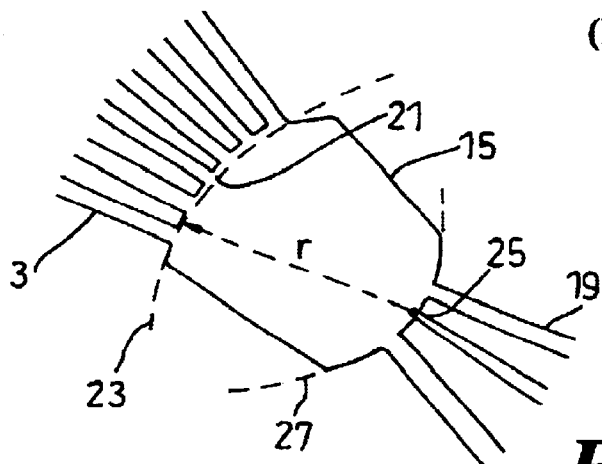
FIG. 3 is a schematic drawing of the output star coupler of the AWG of FIG. 1.
Figure 4:
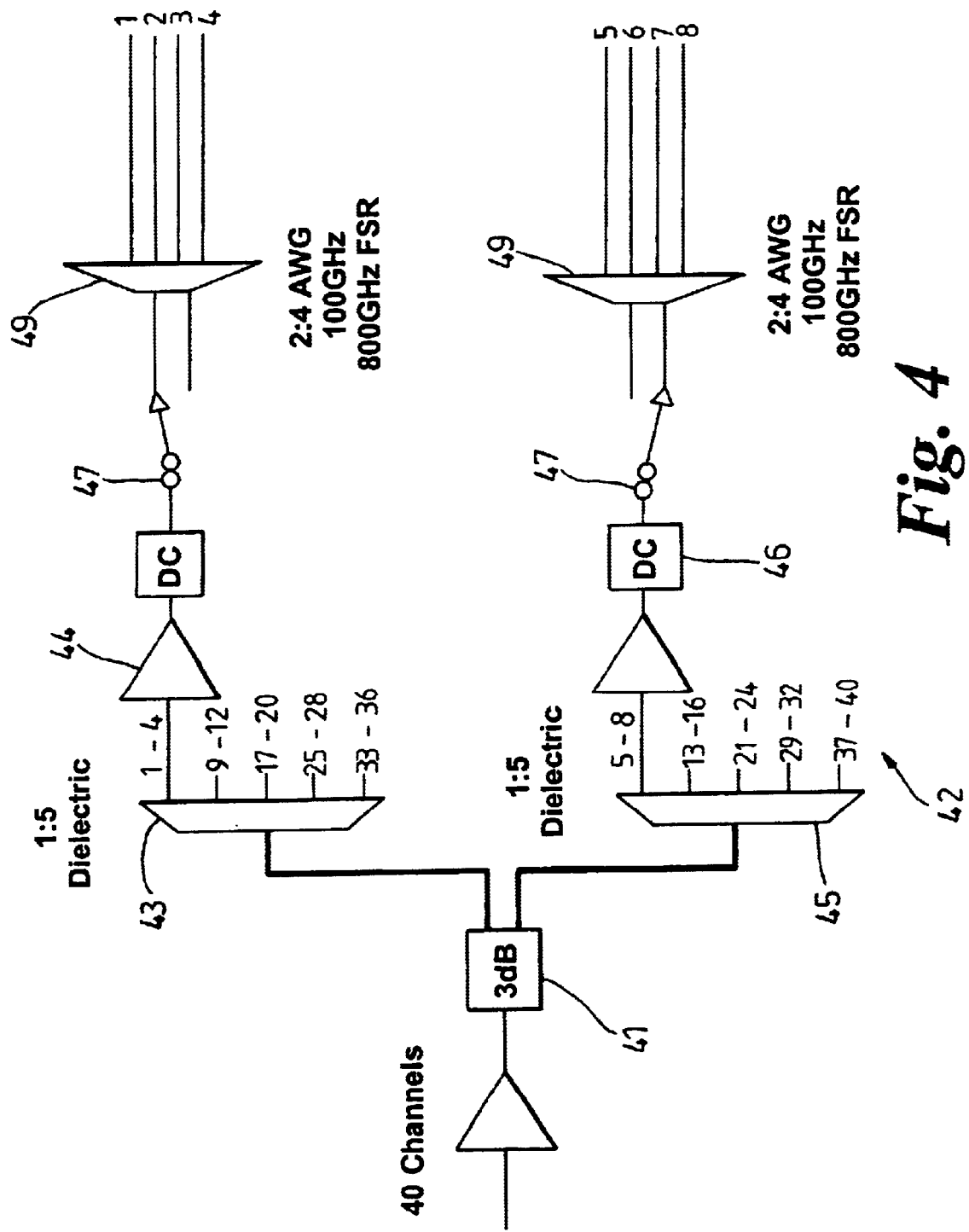
FIG. 4 is a schematic drawing of a first embodiment of the invention.

FIG. 4 is a schematic drawing of the first embodiment of the invention. A 40-channel C-band input signal is provided, in which adjacent channels are separated by 100 GHz.

The input signal is split by a 3 dB splitter 41 into two, and passed to first and second coarse filters 43, 45. In this embodiment, the coarse filters are dielectric filters. The first coarse filter 43 has five outputs 42, with passbands of channels 1 to 4, channels 9 to 12, channels 17 to 20, channels 25 to 28 and channels 33 to 36 respectively, The second coarse filter 45 likewise has five outputs 42, this time with passbands of channels 5 to 8, channels 13 to 16, channels 21 to 24, channels 29 to 32 and channels 37 to 40.

Each of the ten outputs 42 is connected to a like arrayed waveguide grating (AWG) 49 through an amplifier 44, a dispersion compensator 46 and a two-position optical switch 47. For clarity, only two of the AWGs are shown. The dispersion compensator 46 and/or the amplifier 44 can be omitted if not required.

Figure 5:
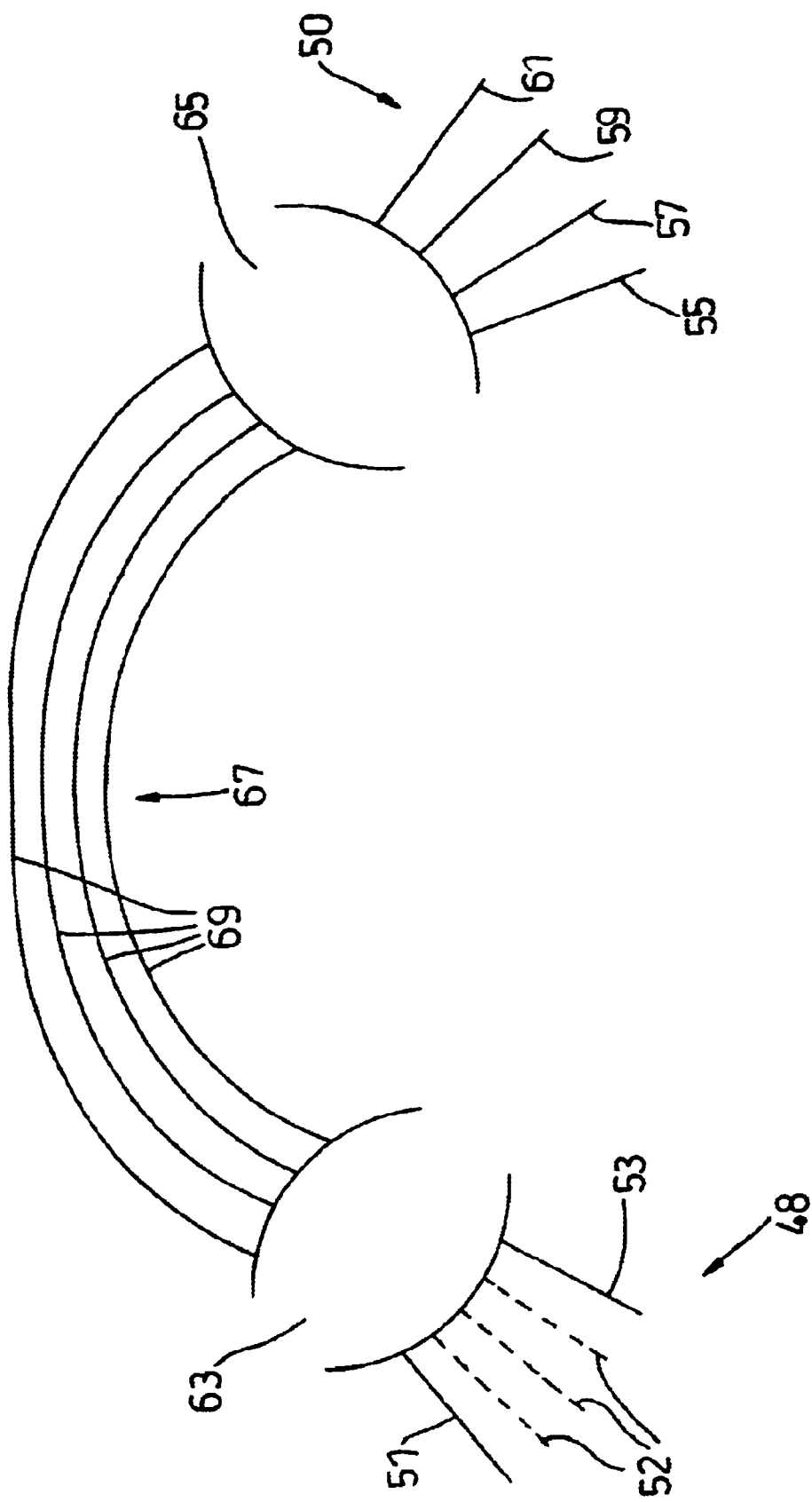
FIG. 5 is a schematic of an AWG used in the embodiment of FIG. 4.

The AWG is shown schematically in FIG. 5. It is a 2:4 AWG, i.e. with two input waveguides 51, 53 forming inputs 48 and 4 output waveguides 55, 57, 59, 61 forming outputs 50. The input 63 and output 65 star couplers connect the input and output waveguides to an array 67 of waveguides 69 arranged therebetween.

In the example, the spacing between the input waveguides 51, 53 at the input star coupler 63 is four times that of the output waveguides 55, 57, 59, 61 at the output star coupler 65. This is shown schematically by the dotted lines 52 in FIG. 5 which correspond to the omitted waveguide, not physically present waveguides. Since the spacing of the waveguides corresponds (to a first order of approximation) to the frequency spacing, the frequency spacing of the input waveguides is also four times that of the outputs.

In the example, the spacing of the input waveguides 51, 53 at the input star coupler 63 corresponds to a 400 GHz separation and the spacing of the output waveguides 55, 57, 59, 61 at the output star coupler 65 to a 100 GHz separation between waveguides. The AWG has an 800 GHz FSR. In this way, two input waveguides 48 at 400 GHz sprig cover the FSR, and one of the input waveguides 51 can be used for channels 1 to 4, 9 to 12, 17 to 20, 25 to 29 and 33 to 36, and one for channels 5 to 8, 13 to 16, 21 to 24, 29 to 32 and 37 to 40. It will be appreciated that a larger number of input waveguides may be used, if required.

Although only 4 waveguides 69 in the array are shown in FIG. 5 the skilled person will appreciate that there will in practice normally be more, for example 25 waveguides. Further, the frequency separation of the output waveguides can be varied depending on the channel spacing required.

The design and manufactured of AWGs is known and will not be described further. The lateral spacing between the waveguides at the array may be selected for the desired results. Good results have been calculated for devices with a small separation between adjacent waveguides in the array, of order 6 $\mu$m at the star couplers.

Referring back to FIG. 4, after manufacture each of the switches 47 connected to the first coarse filter 43 are switched to a first position and each of the switches 47 connected to the second coarse filter 45 are switched to a second position.

Each of the AWGs is identical as manufactured. In other words, the AWGs are of common design. The AWGs are configured by means of the switches 47 connected to the AWGs.

With the switch in the first position the AWGs demultiplex optical signals of frequency corresponding to channels 1 to 4 and transmit the light into the four output waveguides 55, 57, 59, 61 respectively. Since the FSR is 800 GHz, corresponding to 8 channels, the effect of the AWG repeats every 8 channels. Optical signals in channels 9–12 are likewise divided between the four outputs to separate the channels. Accordingly, the light in channels corresponding to the first coarse filter 43 is separated into the corresponding 20 outputs of the 5 AWGs connected to the first coarse filter.

If any light in an incorrect channel (e.g. channel 5) should pass through the first coarse filter 43 it will be rejected by the AWG since no oft corresponds to that channel with the switch in the first position. Thus the arrangement of the present invention reduces cross-talk.

Likewise, with the switch in the second position the AWGs demultiplex light of frequency corresponding to channels 5 to 8 and transmit the light into four output waveguides 55, 57, 59 61 respectively. Since the FSR is 800 GHz, corresponding to 8 channels, the effect of the AWG repeats every 8 channels and light from the second output of the second coarse filter 45 in channels 13 to 16 is likewise split into four. Accordingly, the light in channels corresponding to the second coarse filter 45 is separated into the corresponding 20 outputs of the 5 AWGs connected to the second coarse filter 45.

In this way input light is split into 40 separate channels for further processing.

The switches may be automatically configured after manufacture of the completed device, by software used to configure the demultiplexer. In this way, the system can readily be manufactured by unskilled personnel—it is simply necessary to connect one like AWG to each output of a coarse filter. Thus, errors are avoided whim might result from bad component selection for arrangements where unskilled manufacturing personnel have to select between very similar components.

Figure 6:
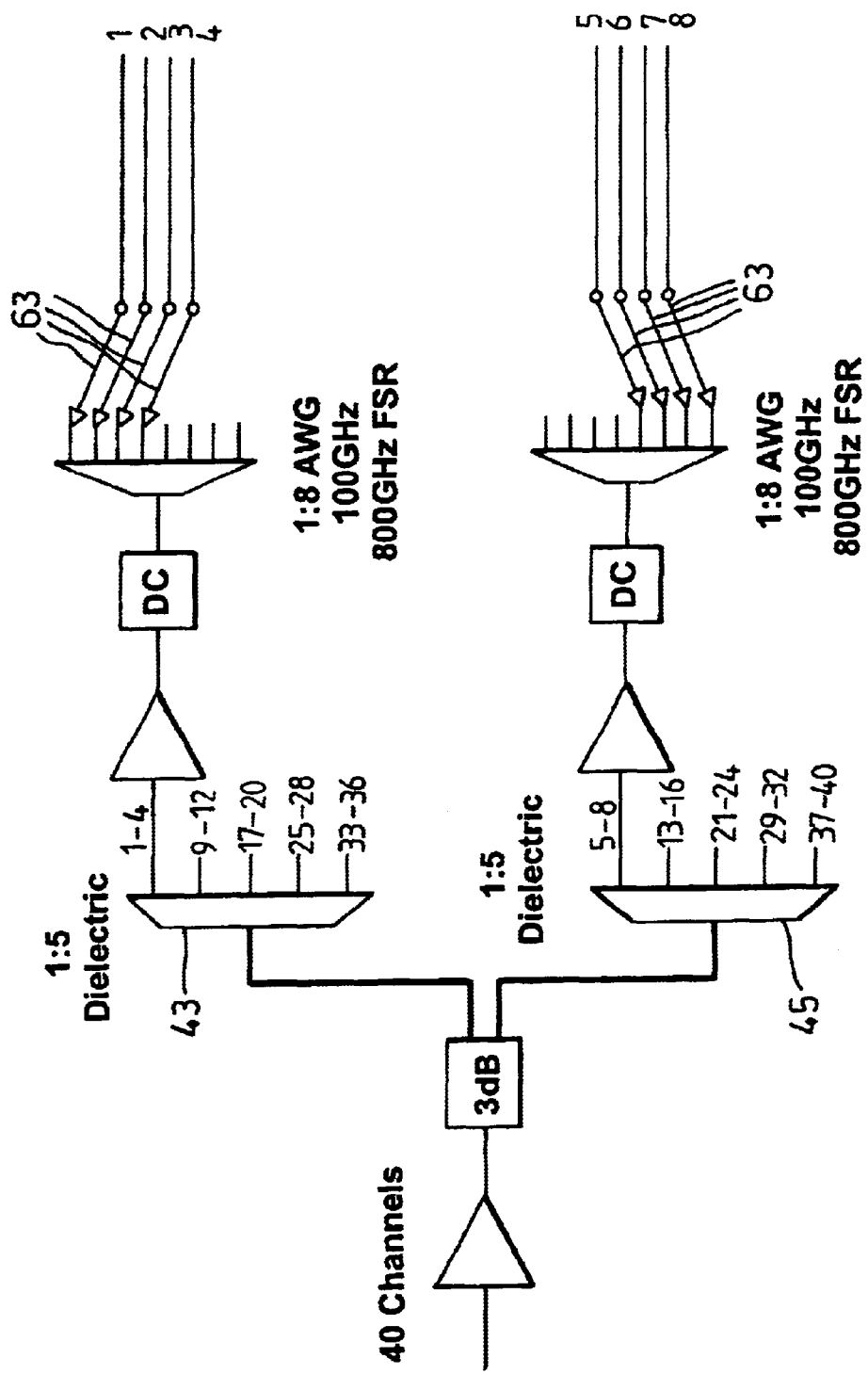
FIG. 6 is a schematic drawing of a first comparative example.

A comparative example is illustrated in FIG. 6. In this approach, 1:8 AWGs are used instead of the 2:4 AWGs of the first embodiment. Instead of a single switch provided on the inputs 4 separate switches 63 are provided on the outputs of each AWG to connect the outputs corresponding to channels 1 to 4 of AWGs connected to the first coarse filter 43 and the outputs corresponding to channels 5 to 8 of AWGs connected to the second coarse filter 45.

Figure 7:
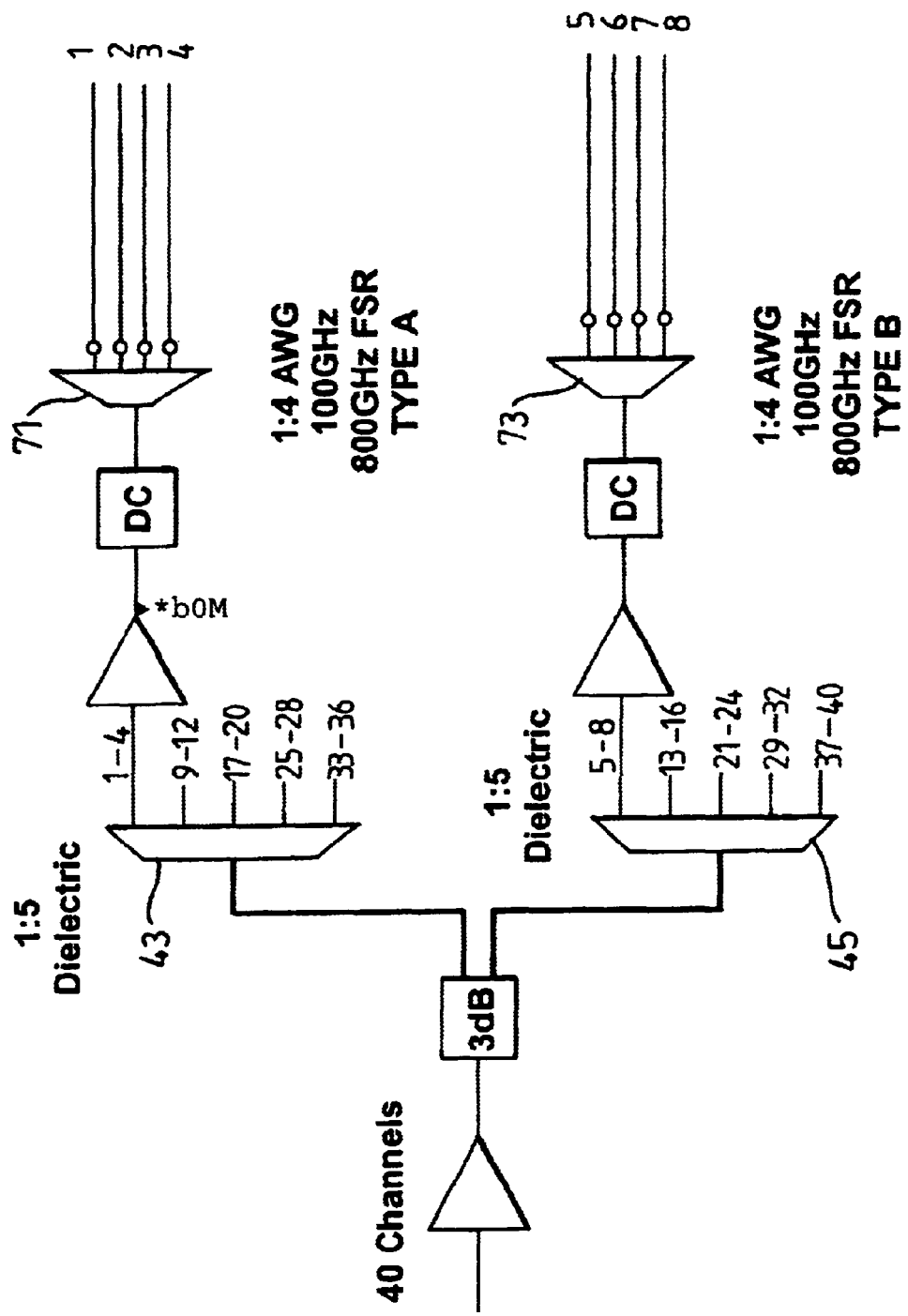
FIG. 7 is a schematic drawing of a second comparative example.

A further comparative example is illustrated in FIG. 7. In this approach, the switches are eliminated and two separate versions of AWG are used. A first version 71 is used for AWGs connected to the first coarse filter 43 and a second version 73 is used for AWGs connected to the second coarse filter 45.

In this arrangement, the different versions of the AWGs are manufactured to substantially the same design, with minor variation to provide the two separate configurations, one which demultiplexes channels 1 to 4, 9 to 12, 17 to 20, 25 to 28 and 33 to 36 and rejects channels 5 to 8, 13 to 16, 21 to 24, 29 to 32 and 37 to 40, and one the other way around. This arrangement removes the need to configure the AWGs, at the cost of one extra component for the parts bin.

Figure 8A:
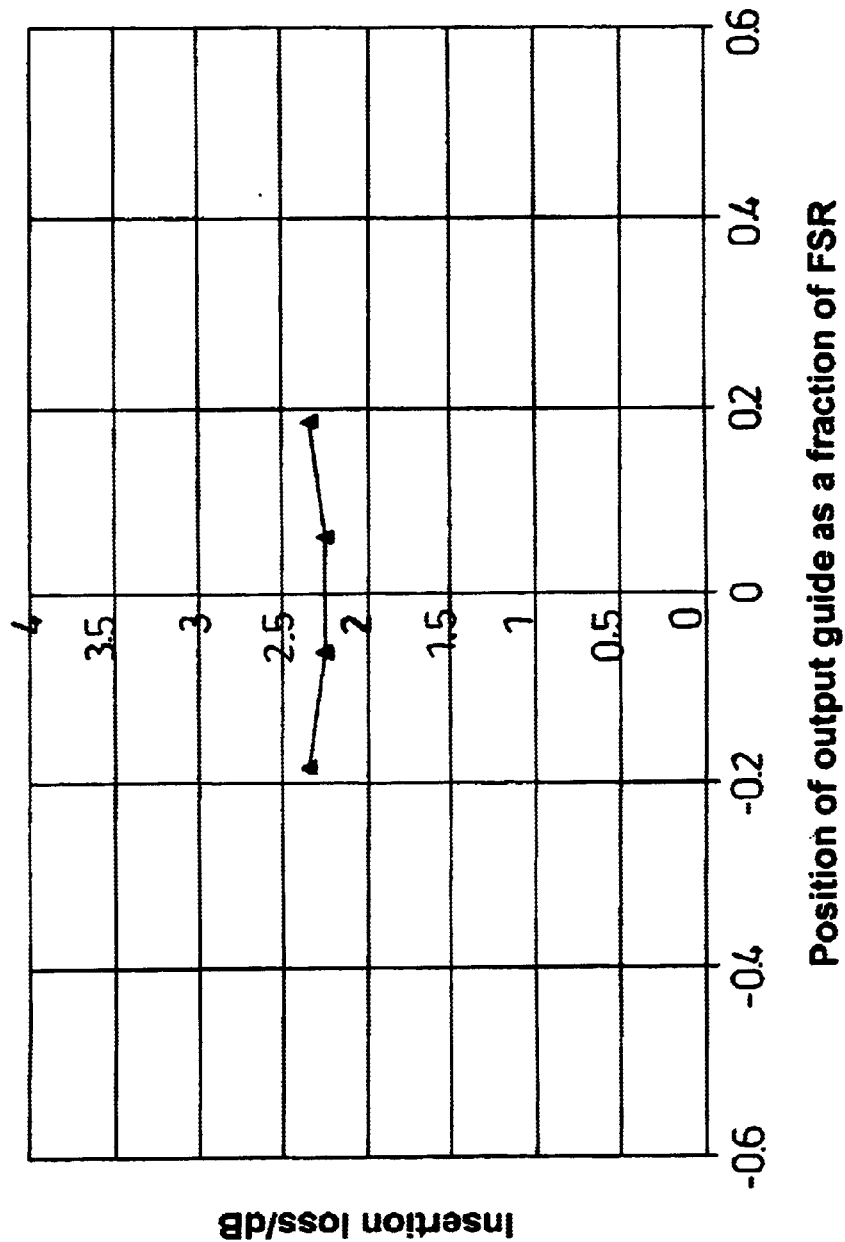
FIG. 8 illustrates the insertion losses of the devices of FIGS. 4 to 7.
Figure 8B:
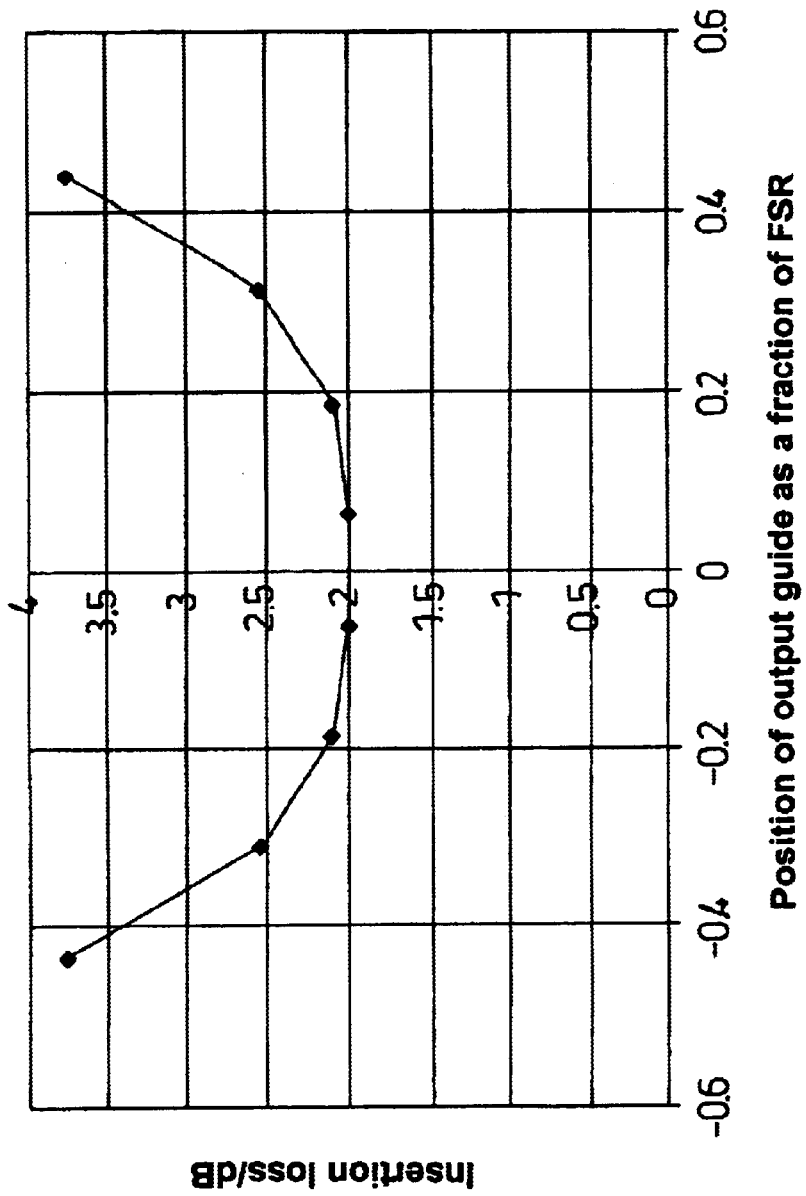
Figure 8C:
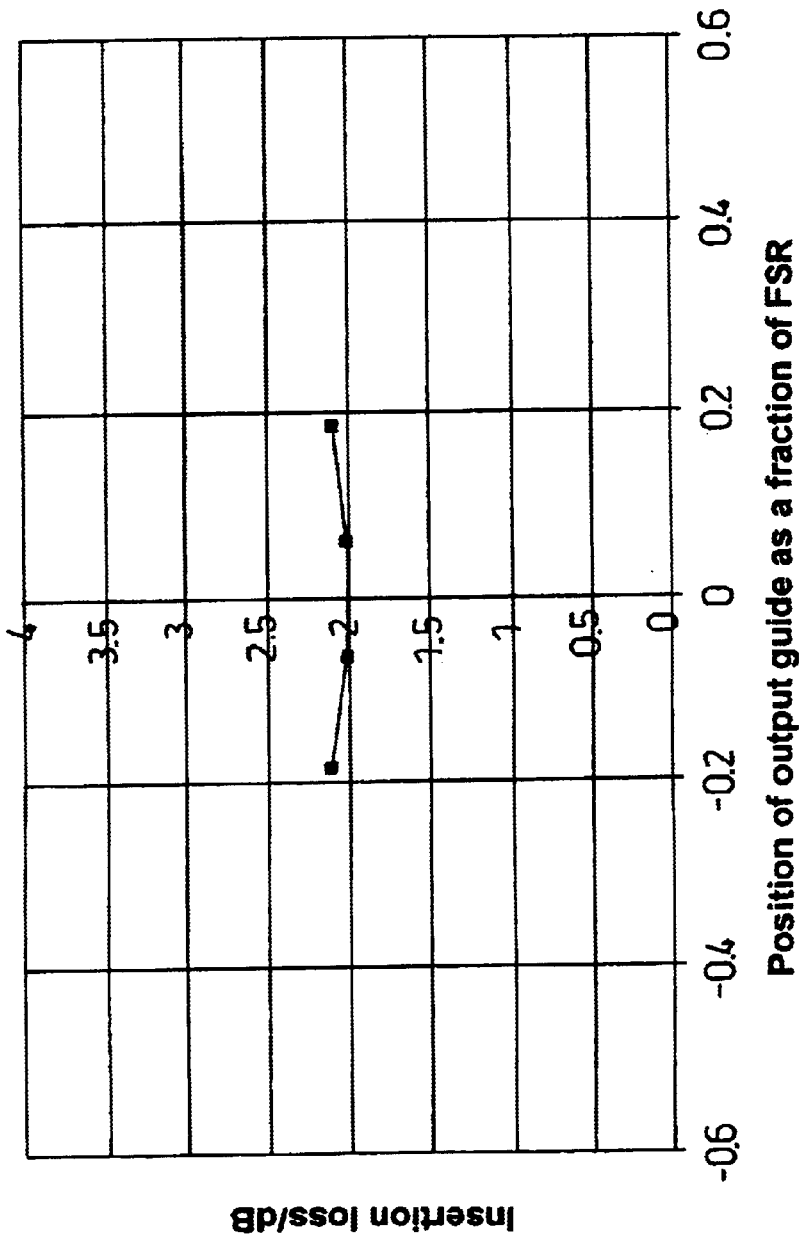

A comparison of these approaches is shown in FIG. 8, which shows the insertion loss for three embodiments. FIG. 8a shows the results for the embodiment, FIG. 8b for the first comparative example of FIG. 6 and FIG. 8c for the second comparative example of FIG. 7. The second comparative example (FIG. 8c) shows a low and relatively uniform insertion loss of only 2 dB. However, this embodiment uses two different AWGs. The first comparative example provides a less uniform insertion loss (FIG. 8b). The larger number of output guides substantially fills the FSR and results in a less uniform distribution of light across the output waveguides. This results in lower intensities of light being received at the outermost waveguides of the eight, leading to increased insertion losses for these outer guides.

The system of the first embodiment (FIG. 8a) gives a good result, in combination with the use of only a single type of AWG for manufacturing convenience. A uniform insertion loss is seen, although the loss is about 0.25 dB higher than in the second comparative example. This increased insertion loss is due to the off-centre input waveguides into the input star coupler, a less efficient position than the central input waveguide used in the comparative examples.

Thus, by providing a plurality of input guides the AWG only has to demultiplex signals from a part of the FSR with each input guide. This increases the uniformity of the output to a level comparable to that of the arrangement of FIG. 7 without the corresponding disadvantage of needing to stock multiple parts.

Figure 9:
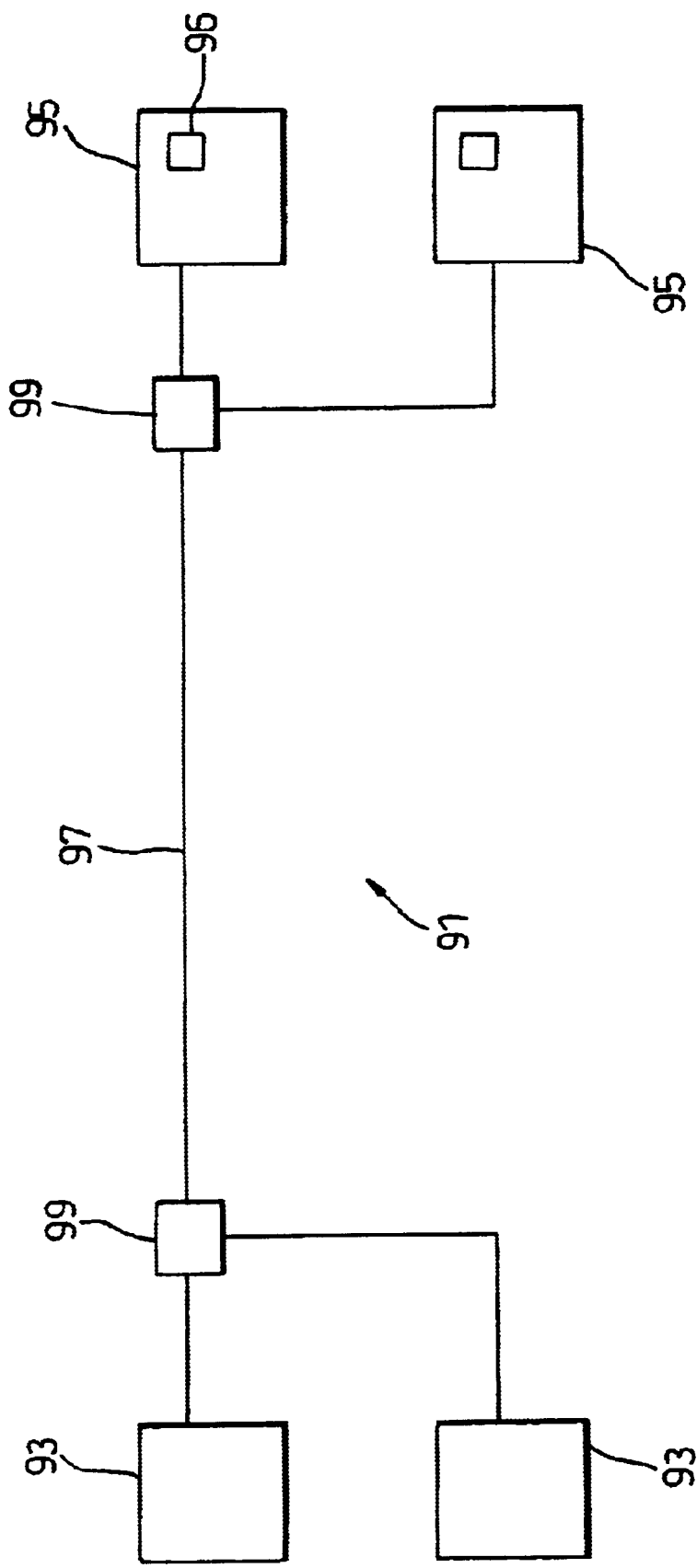
FIG. 9 illustrates an optical network according to the invention.

Referring to FIG. 9, an optical demultiplexer according to the invention may be incorporated into a node of an optical network 91.

The optical network includes a transmission node 93 providing a WDM optical signal, and a receiving node 95 for receiving the WDM optical signal. FIG. 9 illustrates two transmission nodes 93 and two receiving nodes 95, though it is of course possible to have many more. An optical fiber link 97 connects the transmission and receiving nodes. Switches 99 connect transmission nodes 93 to receiving nodes 95.

The receiving node 95 includes an optical demultiplexer 96 for demultiplexing the WDM signal as described above.

Although the nodes are labelled transmission nodes 93 and receiving nodes 95, the skilled person will appreciate that nodes may be able to function as both transmission 93 and receiving 95 nodes.

Figure 10:
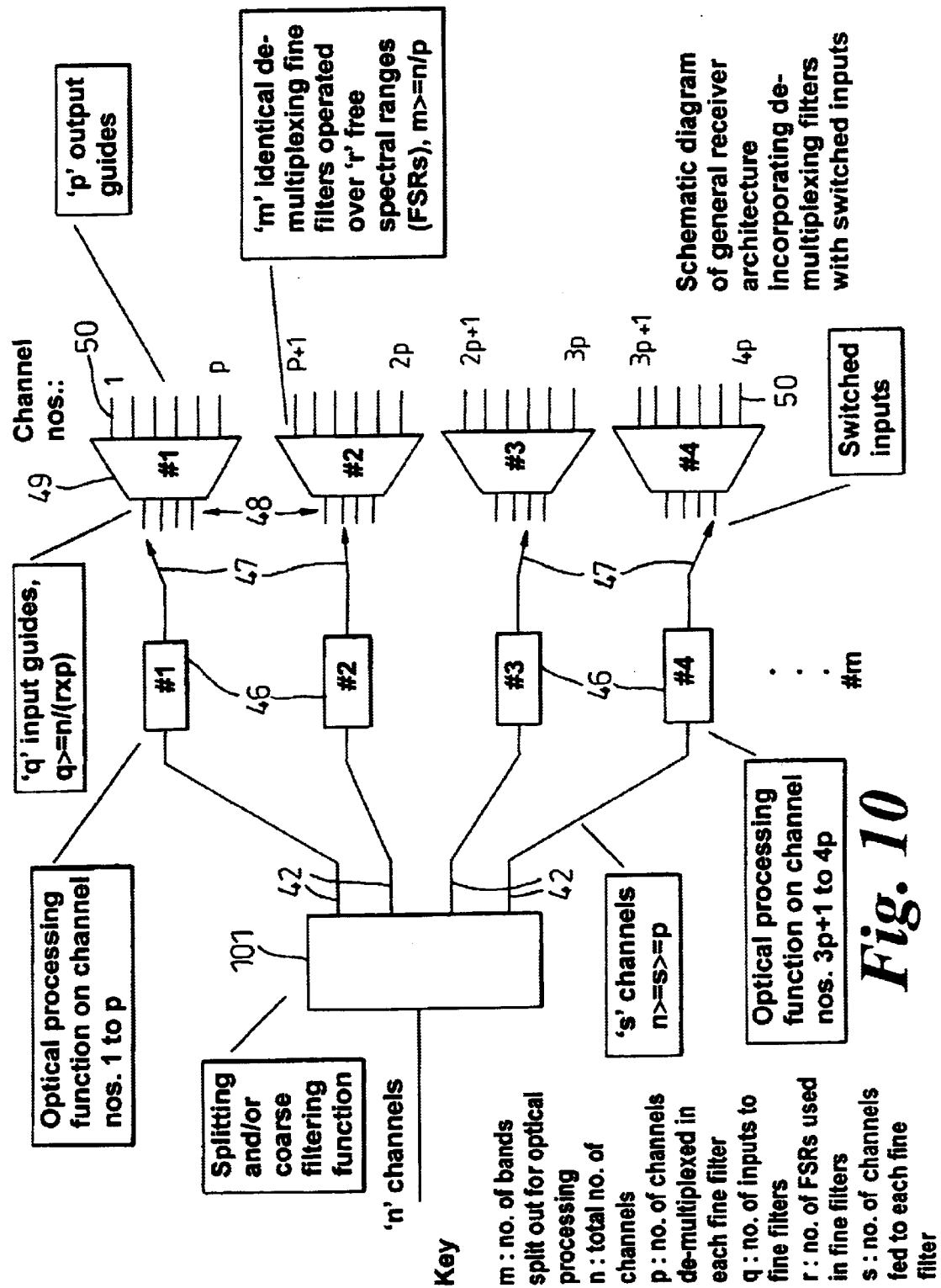
FIG. 10 is a schematic drawing of a second embodiment of the invention.

A further embodiment of an optical system according to the invention is illustrated in FIG. 10. A splitter 101 splits n channels between a plurality of outputs 42. The splitter may also incorporate some filtering so that each output carries a corresponding group of channels Each group of channels then passes through a respective optical processor 46. The optical processors may carry out any required function, for example dispersion compensation and/or gain control.

The outputs of the optical processors 46 are then fed through switches 47 to respective demultiplexers or fine filters 49. Each of these demultiplexers 49 has a plurality of inputs 48, and the switches select the inputs 48. Depending on which input 48 of the demultiplexer is selected by the switch 47, a different frequency band is demultiplexed and split between the outputs 50. The switches are controlled so that the demultiplexers demultiplex the frequency of the corresponding group of channels passed through the optical processor.

In this example, the demultiplexers are not necessarily cyclic and do not necessarily repeat in frequency. Accordingly, they may be implemented in a wider variety of technologies, including arrayed waveguide gratings, dielectric filters, Fabry-Perot filters and free space diffraction grating devices, for example.

By not requiring the fine filters 49 to operate over the whole frequency range of operation for each input the transmission loss and other properties can be made more uniform.

The provision of switches 47 eases manufacture of the device since each of the fine filters 49 can simply be attached to corresponding switches without having to specify or accurately determine the required frequency range at the time of manufacture.

The splitter 101 need not have a filtering function, i.e. it can be a simple splitter. Nevertheless, the splitter may include some coarse filtering. Preferably, the fine filters reject adjacent frequencies to those demultiplexed. In combination with the selection on the inputs to the fine filters, cross talk can be reduced since any stray signal from adjacent channels is rejected. The rejection need not be total; any reduction in the transmission of adjacent filters can reduce cross-talk.

The embodiments described above are purely exemplary and the skilled person will be able to arrive at many modifications to the embodiments without departing from the scope of the claims.

It will be apparent to the skilled person that although the description refers to frequency bands the bands need not be expressed in terms of frequency, but may also be expressed in terms of wavelength, channel or any other label to distinguish frequency bands.

Furthermore, although the invention has been described with reference to a system having 40 channels in the C-band the skilled person will readily realise that a similar system could also be used to demultiplex a different number of channels, or a different frequency band.

In a modification of the invention, one or more of the filters are replaced by an alternative filter type. For example, an interleaving or polarisation filter may be used as the coarse filter. These use polarisation manipulation techniques to produce an interleaving filter that effectively separates groups of channels at the output into two orthogonal polarisations. In other words a wavelength division multiplexed (WDM) signal is separated in the filter into two optical signals at its output, that are polarised at right angles to each other. A polarising beam splitter may then be used to separate the two orthogonal polarised signals.

Such a filter itself consists of a stack of birefringent waveplates that are carefully set at the appropriate angle to each other. The input optical signal passes through each waveplate in turn, and the components of the signal resolved along the principal axes of each waveplate experience differing delays. In this way the temporal pulse response and the frequency response of the filter can be built up. The filter response repeats at a frequency interval that depends on the optical thickness of the waveplates.

The coarse filter is not absolutely required and may be simply replaced by a splitter, leaving the filtering to be carried out by the demultiplexers.

In the described embodiments, the demultiplexers of like design are configured using switches or during manufacture. In modification of the invention, other approaches may be used, for example by connecting optical fibers to alternative inputs or outputs, depending on the configuration required.

We claim:

1. An optical system, comprising:
   an optical splitter for splitting an input optical signal between optical outputs; and
   a plurality of demultiplexers of like design, each demultiplexer having a plurality of input guides and a plurality of output guides, each input guide having a predetermined and different frequency range for which optical signals input into the input guide are divided between the plurality of output guides according to frequency;
   wherein the optical outputs of the optical splitter are connected to respective demultiplexers through input guides having a plurality of different predetermined frequency ranges.

2. An optical system according to claim 1 wherein the predetermined frequency ranges of the input guides span a predetermined input light frequency range without overlapping.

3. An optical system according to claim 1 wherein the optical splitter divides light into predetermined broad frequency ranges output on respective optical outputs which in turn are connected to input guides having corresponding predetermined frequency ranges.

4. An optical system according to claim 1, wherein:
   the optical splitter includes at least one coarse optical filter to filter input light into a plurality of predetermined groups of channels and to output the groups of channels on respective optical outputs; and
   the optical outputs are connected to respective demultiplexers, each optical output connected to the respective demultiplexer through an input guide having a predetermined frequency range corresponding to the frequency of the respective group of channels of the optical output.

5. An optical system according to claim 1 wherein the demultiplexers are arrayed waveguide gratings.

6. An optical system according to claim 5, wherein:
   wherein the optical splitter includes at least one coarse filter having a plurality of outputs for dividing an input optical signal into a plurality of predetermined broad frequency ranges of predetermined width and outputting each predetermined broad frequency range on a respective output;
   the arrayed waveguide gratings have properties that repeat in frequency with a period of the free spectral range;
   the arrayed waveguide gratings have first and second input waveguides, signals input into the different input waveguides rejecting and demultiplexing alternating frequency ranges of the said predetermined width, the first input waveguide rejecting the frequency ranges demultiplexed by the second input waveguide and the second input waveguide rejecting the frequency ranges demultiplexed by the first input waveguide; and
   the input waveguides of the arrayed waveguide gratings are connected to the outputs of the coarse filter alternate with increasing frequency of the respective broad frequency range so that each arrayed waveguide grating demultiplexes the signal corresponding to the broad frequency range of the output of the coarse filter to which it is attached.

7. An optical system for optical processing of an optical signal divided into a plurality of predetermined groups of channels, comprising:
   a plurality of optical outputs, each optical output outputting signals in a respective frequency range that corresponds to a predetermined group of channels;
   a plurality of demultiplexers of like design, each demultiplexer having a plurality of input guides and a plurality of output guides, each input guide having a predetermined and different frequency range for which optical signals input into the input guide are divided between the plurality of output guides according to frequency;
   wherein the optical outputs are connected to respective demultiplexers, each optical output connected to the respective demultiplexer through an input guide having a predetermined frequency range corresponding to the frequency of the respective frequency range of the optical output.

8. An optical system according to claim 7 wherein the demultiplexers have properties that repeat in frequency with a period of the free spectral range, and the demultiplexer input guides correspond to different parts of the free spectral range.

9. An optical system according to claim 8 wherein the demultiplexers are arrayed waveguide gratings having a plurality of input waveguides having a frequency spacing and a plurality of output waveguides, the frequency spacing of the input waveguides corresponding to the frequency spacing of the groups of channels.

10. An optical demultiplexer according to claim 9 wherein the arrayed waveguide devices have properties that repeat in frequency with a period of the free spectral range and the configurations of the arrayed waveguide gratings connected to the optical outputs are cyclic with increasing frequency of the respective broad frequency range wherein the cycle repeats with a repeat frequency substantially equal to the free spectral range such that each arrayed waveguide grating demultiplexes the signal corresponding to the broad frequency range of the output of the coarse filter to which it is attached.

11. An optical system according to claim 9 wherein the output waveguides have a frequency spacing corresponding to single channels.

12. An optical system according to claim 7 further comprising switches between the optical outputs and the respective inputs of the demultiplexers to switch optical signals into the corresponding input of the demultiplexer.

13. An optical system according to claim 7 further comprising dispersion compensators connected to the optical outputs for correcting the dispersion of the respective frequency ranges.

14. An optical system according to claim 7 wherein the demultiplexers demultiplex signals in the predetermined frequency range applied to the corresponding input and reject adjacent frequencies.

15. An optical system according to claim 7 further comprising dispersion compensators connected between the optical outputs and the demultiplexers for compensating optical dispersion in the respective predetermined frequency ranges.

16. An optical demultiplexer according to claim 7 wherein the optical outputs are on a coarse filter including a splitter and a plurality of dielectric filters for splitting an input optical signal between the optical outputs according to frequency.

17. A node for an optical telecommunications system including an optical demultiplexer comprising:
   a coarse filter having a plurality of optical outputs, each optical output outputting signals in a respective frequency range;
   a plurality of demultiplexers of like design, each demultiplexer having a plurality of input guides and a plurality of output guides, each input guide having a predetermined and different frequency range for which optical signals input into the input guide are divided between the plurality of output guides according to frequency;
   wherein the optical outputs are connected to respective demultiplexers, each optical output connected to the respective demultiplexer through an input guide having a predetermined frequency range corresponding to the frequency of the respective frequency range of the optical output.

18. An optical telecommunications system comprising:
   a transmission node providing a WDM optical signal;
   a receiving node for receiving the WDM optical signal; and
   an optical fiber connecting the transmission and receiving nodes;
   wherein the receiving node includes:
      an optical demultiplexer for demultiplexing the WDM signal including a coarse filter having a plurality of optical outputs, each optical output outputting signals in a respective frequency range, and
      a plurality of demultiplexers of like design, each demultiplexer having a plurality of input guides and a plurality of output guides, each input guide having a predetermined and different frequency range for which optical signals input into the input guide are divided between the plurality of output guides according to frequency,
      wherein the optical outputs are connected to respective demultiplexers, each optical output connected to the respective demultiplexer through an input guide having a predetermined frequency range corresponding to the frequency of the respective frequency range of the optical output.

19. A method of processing an optical signal, including:
   processing the optical signal in a number of broad frequency bands;
   supplying each of the broad frequency bands to an input guide of one of a plurality of like arrayed waveguide gratings having a plurality of input guides and a plurality of output guides, each input guide having a predetermined and different frequency range for which optical signals input into the input guide are divided between the plurality of output guides according to frequency,
   wherein each broad frequency band is input into an input guide corresponding to the broad frequency band so that the broad frequency bands are split into a plurality of narrow frequency bands and output on respective output guides.

20. A method of manufacturing an optical demultiplexer, including:
   connecting to each output of a coarse filter for dividing an optical signal into a number of broad frequency bands an optical switch for switching the optical signal between one of a input guides of an arrayed waveguide grating having a plurality of output guides, each input guide having a predetermined and different frequency range for which optical signals input into the input guide are divided between the plurality of output guides according to frequency; and
   configuring the switches such that the configuration of the arrayed waveguide grating connected to each of the plurality of outputs of the coarse filter in ascending frequency order is cyclical.

* * * * *